United States Patent
Wang

(10) Patent No.: US 9,383,223 B2
(45) Date of Patent: Jul. 5, 2016

(54) SMART METER SYSTEM ARCHITECTURE

(71) Applicant: International Technological University, San Jose, CA (US)

(72) Inventor: Karl L. Wang, Los Altos, CA (US)

(73) Assignee: INTERNATIONAL TECHNOLOGICAL UNIVERSITY, San Jose, CA (US)

( * ) Notice: Subject to any disclaimer, the term of this patent is extended or adjusted under 35 U.S.C. 154(b) by 0 days.

(21) Appl. No.: 14/330,669

(22) Filed: Jul. 14, 2014

(65) Prior Publication Data

US 2016/0011005 A1    Jan. 14, 2016

(51) Int. Cl.
| | |
|---|---|
| *G01D 4/00* | (2006.01) |
| *G06Q 20/14* | (2012.01) |
| *G06Q 50/06* | (2012.01) |
| *G06Q 10/00* | (2012.01) |

(52) U.S. Cl.
CPC ............... *G01D 4/002* (2013.01); *G06Q 10/20* (2013.01); *G06Q 20/145* (2013.01); *G06Q 50/06* (2013.01)

(58) Field of Classification Search
CPC ....... G01D 4/002; G06Q 10/20; G06Q 50/06; G01R 21/001; G01R 21/005; G01R 21/006; G01R 21/07; G01R 21/06; G01R 21/10; G01R 21/1271; G01R 21/1273; G01R 21/1276; G01R 21/1278; G01R 19/28; G01R 19/30; G01R 21/1333; G01R 21/1336
See application file for complete search history.

(56) References Cited

U.S. PATENT DOCUMENTS

| | | |
|---|---|---|
| 3,152,250 A | 10/1964 | Platzer, Jr. |
| 4,417,099 A | 11/1983 | Pierce |
| 4,437,059 A | 3/1984 | Hauptmann |
| 4,896,106 A | 1/1990 | Voisine et al. |
| 5,325,048 A * | 6/1994 | Longini ..................... 324/74 |
| 5,450,007 A | 9/1995 | Payne et al. |
| 5,773,978 A | 6/1998 | Becker |
| 6,665,620 B1 | 12/2003 | Burns et al. |
| 7,421,205 B2 | 9/2008 | Ramirez |
| 7,768,424 B2 | 8/2010 | Harvey et al. |
| 8,228,209 B2 | 7/2012 | Smith |
| 8,234,017 B2 | 7/2012 | Ahn |
| D668,983 S | 10/2012 | Manion et al. |
| 8,466,803 B2 | 6/2013 | Jonsson et al. |
| 8,509,109 B2 | 8/2013 | Guo et al. |
| 8,587,290 B2 | 11/2013 | Pamulaparthy et al. |

(Continued)

FOREIGN PATENT DOCUMENTS

| | | |
|---|---|---|
| GB | 1542290 | 3/1979 |
| WO | WO 9624070 A1 * | 8/1996 |

OTHER PUBLICATIONS

The International Search Report and the Written Opinion of the International Searching Authority issued for International Application No. PCT/US2015/040218, mailed on Jan. 6, 2016.

(Continued)

*Primary Examiner* — An T Nguyen
(74) *Attorney, Agent, or Firm* — Sawyer Law Group, P.C.

(57) ABSTRACT

A smart meter system architecture comprises of a local server, a coordinator, and a plurality of smart meters in a one-to-many data communication system configuration is disclosed. The invention discloses the architecture for a coordinator-server interface control register, data registers, routing table, non-volatile memory, parameter register, non-interruptible battery backup subsystem, and a low-power energy calculation and calibration method for resistive loads.

15 Claims, 10 Drawing Sheets

(56) References Cited

U.S. PATENT DOCUMENTS

| | | |
|---|---|---|
| 8,593,135 B2 | 11/2013 | Chemel et al. |
| 8,654,711 B2 | 2/2014 | Guo et al. |
| D701,784 S | 4/2014 | Manion et al. |
| 8,750,100 B2 | 6/2014 | Guo et al. |
| 2004/0254750 A1 | 12/2004 | Macfarlene et al. |
| 2007/0016539 A1 | 1/2007 | Groft et al. |
| 2008/0042873 A1 | 2/2008 | Harvey et al. |
| 2008/0048883 A1 | 2/2008 | Boaz |
| 2009/0034418 A1 | 2/2009 | Flammer, III et al. |
| 2009/0135018 A1 | 5/2009 | Veillette et al. |
| 2009/0198384 A1 | 8/2009 | Ahn |
| 2010/0039263 A1 | 2/2010 | Chen et al. |
| 2010/0131329 A1 | 5/2010 | An et al. |
| 2010/0253538 A1 | 10/2010 | Smith |
| 2011/0049984 A1 | 3/2011 | Son |
| 2011/0279353 A1 | 11/2011 | Son et al. |
| 2011/0283060 A1 | 11/2011 | Ware et al. |
| 2012/0026715 A1 | 2/2012 | Manion et al. |
| 2012/0083937 A1 | 4/2012 | Kong et al. |
| 2012/0123709 A1 | 5/2012 | Chen et al. |
| 2012/0124367 A1 | 5/2012 | Ota et al. |
| 2012/0131324 A1 | 5/2012 | Ansari et al. |
| 2012/0137126 A1 | 5/2012 | Matsuoka et al. |
| 2012/0200424 A1 | 8/2012 | Nishizawa et al. |
| 2012/0231828 A1 | 9/2012 | Wang et al. |
| 2012/0249121 A1 | 10/2012 | Pamulaparthy et al. |
| 2012/0280832 A1 | 11/2012 | Jonsson et al. |
| 2012/0280833 A1 | 11/2012 | Jonsson et al. |
| 2012/0287596 A1 | 11/2012 | Manion et al. |
| 2012/0327792 A1 | 12/2012 | Guo et al. |
| 2013/0015716 A1 | 1/2013 | Matsushima et al. |
| 2013/0057367 A1 | 3/2013 | Smith |
| 2013/0077610 A1 | 3/2013 | Amini et al. |
| 2013/0079938 A1 | 3/2013 | Lee et al. |
| 2013/0208583 A1 | 8/2013 | Guo et al. |
| 2013/0223334 A1 | 8/2013 | Guo et al. |
| 2013/0262844 A1 | 10/2013 | Hester |
| 2013/0300576 A1* | 11/2013 | Sinsuan et al. ......... 340/870.02 |
| 2014/0039699 A1 | 2/2014 | Forbes |
| 2014/0156093 A1 | 6/2014 | Brian et al. |
| 2014/0167979 A1 | 6/2014 | Soma et al. |
| 2014/0277788 A1 | 9/2014 | Forbes, Jr. |

OTHER PUBLICATIONS

The International Search Report and the Written Opinion of the International Searching Authority issued for International Application No. PCT/US2015/040213, mailed on Oct. 30, 2015.

The International Search Report and the Written Opinion of the International Searching Authority issued for International Application No. PCT/US2015/040201, mailed on Dec. 28, 2015.

* cited by examiner

*Figure 3*

Coordinator-Server Interface Control Register

60

| Register | Register Address Offset | Bit | Description |
|---|---|---|---|
| ServControl | 0x0000 | 0 | Parameter register read enable |
| | | 1 | Parameter register write disable Control register write enable |
| | | 2 | Energy calculation reset |
| | | 3 | Relay enable |
| | | 4 | Network discovery enable |
| | | 5 | Routing table read enable |
| | | 6 | Control register read enable |
| | | 7 | Data register read enable |
| | 0x0001 | 0 | Calibration enable |
| ENERGY_RESET_VALUE | 0X0002-0X0005 | | Energy reset value |
| RM_ADD | 0x0006-0x000D | | Smart meter address |
| V_CAL | 0x000E | | Voltage calibration value |
| I_CAL | 0x000F | | Current calibration value |
| T_CAL | 0x0010 | | Energy calibration time in ms |

*Figure 5*

Data Register

| Register Name | dataReg[n] Index | Description |
|---|---|---|
| SM_ADD | 0-3 | Smart meter address |
| RMS_V | 4 | Average RMS voltage (V) since the last reading |
| RMS_I | 5 | Average RMS current (A) since the last reading |
| POWER | 6-7 | Average power (W) |
| ENERGY | 8-9 | Energy used (Wh) since the last reset |
| SM_V | 10 | Smart meter board voltage (V) |
| SM_I | 11 | Smart meter board current (uA). |
| STATUS | 12 | Bit 0: 0 power connection normal<br>Bit 0: 1 battery backup<br><br>Bit 1: 0 battery full<br>Bit 1: 1 battery charging<br><br>Bit 2: 0 smart meter box closed<br>Bit 2: 1 smart meter box open<br><br>Bit 3: 0 no energy calculation reset (flagreset = 0)<br>Bit 3: 1 energy calculation reset (flagreset = 1)<br><br>Bit 4: 0 power relay off (relay = 0)<br>Bit 4: 1 power relay on (relay = 1)<br><br>Bit 5: 0 stop power calculation (flaginc = 0)<br>Bit 5: 1 start power calculation (flaginc = 1)<br>All other bits are not used and set to 0 |

*Figure 8*

Parameter Register

| Parameter | Register Address Offset | paramReg[n] Index | Typical Value | Description |
|---|---|---|---|---|
| MIN_ADC | 0x0000 | 0 | 0 | Minimum output of ADC |
| MAX_ADC | 0x0002 | 1 | 1023 | Maximum output of ADC, for 10-bit-ADC |
| SAMPLE_INT | 0x0004 | 2 | 1000 | interval for sampling, 1000us |
| SAMPLE_WIN | 0x0006 | 3 | 60000 | Sample window size, 6000us |
| MAG_V | 0x0008 | 4 | 1 | Voltage scaling factor |
| MAG_I | 0x000A | 5 | 100 | Current scaling factor |
| MIN_V | 0x000C | 6 | 110 | Min voltage (V) |
| MAX_V | 0x000E | 7 | -100 | Max voltage (V) |
| MIN_I | 0x0010 | 8 | 2 | Min current (A) |
| MAX_I | 0x0012 | 9 | -2 | Max current (A) |
| T_EFF | 0x0014 | 10 | 200 | Effective time period for energy calculation |

SMART METER SYSTEM ARCHITECTURE

FIELD OF THE INVENTION

The present invention is related generally to meters for measuring power and more particularly to a smart meter system.

BACKGROUND

A smart meter system is an interconnected system comprises a local server connected to a coordinator that is linked to many smart meters. The voltage, current, power, and energy data measured by the smart meters are typically sent to the coordinator for determining power usage. The data received at the coordinator is stored in a database in either the local server or in a public network such as the Internet cloud. Commands used in the smart meter system for controlling the data transmission are sent from the local server and transmitted by the coordinator to the smart meters. There is a need to enhance system performance, reliability, testability and manufacturability of the overall system during the product production and prototyping. Accordingly, what is needed is a system and method that addresses such needs. The system and method must be easily implemented, cost effective and adaptable to existing systems. The present invention addresses such a need.

SUMMARY

A data communication architecture for a smart meter system comprised of a local server, a coordinator, and a plurality of smart meters in a one-to-many data communication system configuration is described.

A data communication system is disclosed. The data communication system includes a local server and a coordinator coupled to the local server. A local server sends commands to the coordinator via a control register. The control register is utilized to coordinate activities of the smart meters. The coordinator includes a data register system. The data register system comprises a pair of registers configured such that performance of data transfer is enhanced by eliminating the chance of collision when both read and write operations are accessing a same register. The data communication system also includes a plurality of smart meters coupled to the coordinator. Each of the plurality of smart meters includes a data register. Information from the data register is appropriately provided to the data register system.

BRIEF DESCRIPTION OF THE DRAWINGS

FIG. 3 is an illustration of the more detail of the contents within the coordinator-server interface control register.

FIG. 5 is an illustration of the contents of the data registers in accordance with an embodiment.

FIG. 8 is an illustration of the contents of the parameter register in accordance with an embodiment.

DETAILED DESCRIPTION

The present invention is related generally to meters for measuring power and more particularly to a smart meter system. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
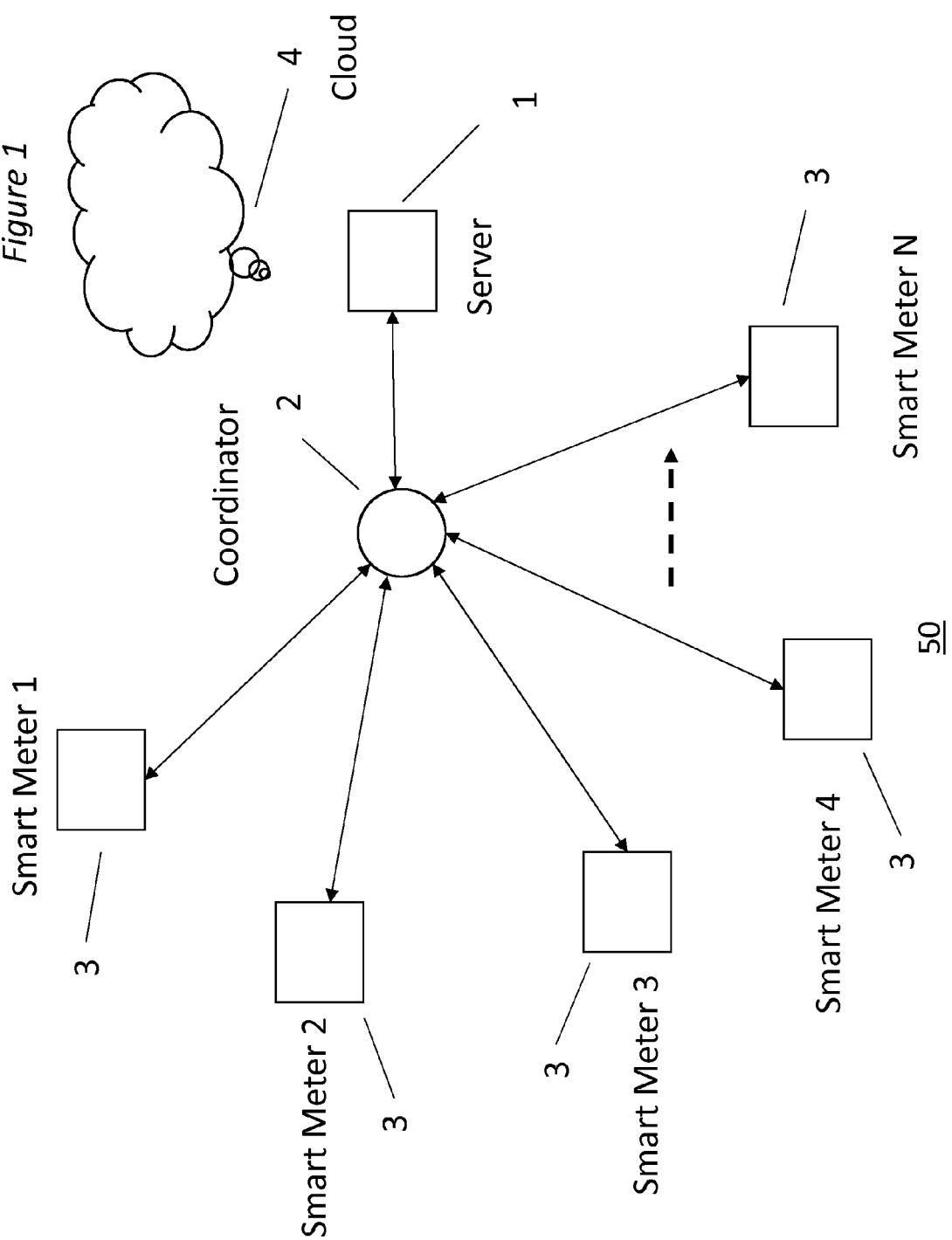
FIG. 1 is an illustration of the smart meter system in accordance with an embodiment.

FIG. 1 is an illustration of the smart meter system 50 in accordance with an embodiment. The smart meter system 50 comprises a local server 1 connected to a coordinator 2 and smart meters 3 (smart meter 1–N). In one embodiment, the local server 1 is connected to the coordinator 2 via wires. In another embodiment, the local server 1 is connected to the coordinator 2 wirelessly.

The smart meter system 50 is a many-to-one data communication topology. In this embodiment, the local server 1 issues a command to the coordinator 2 which executes the command by sending a corresponding data packet wirelessly to the smart meters 3 by a radio frequency (RF) link, e.g. ZigBee that may or may not support an industry standard such as IEEE 802.14.5. Then the smart meters 3 send an appropriate response back to the coordinator 2 by the same RF link. Power usage data sent by the smart meters 3 can be stored in a database hosted in the local server 1 or an internet cloud 4.

The power usage can be accessed for example by displaying web pages using any device that is connected to the local server or the internet. The database can be analyzed to determine optimal power usage and distribution. The power usage can also be analyzed to enable system control, e.g. cut off the power if necessary.

The local server 1 issues commands to the coordinator 2 through a coordinator-server interface control register. The coordinator server interface control register typically resides within the coordinator 2 and allows for the communication between the local sever 1 and the coordinator 2. The coordinator server interface control register streamlines and enhances the performance of tasks between server 1 and coordinator 2.

Figure 2:
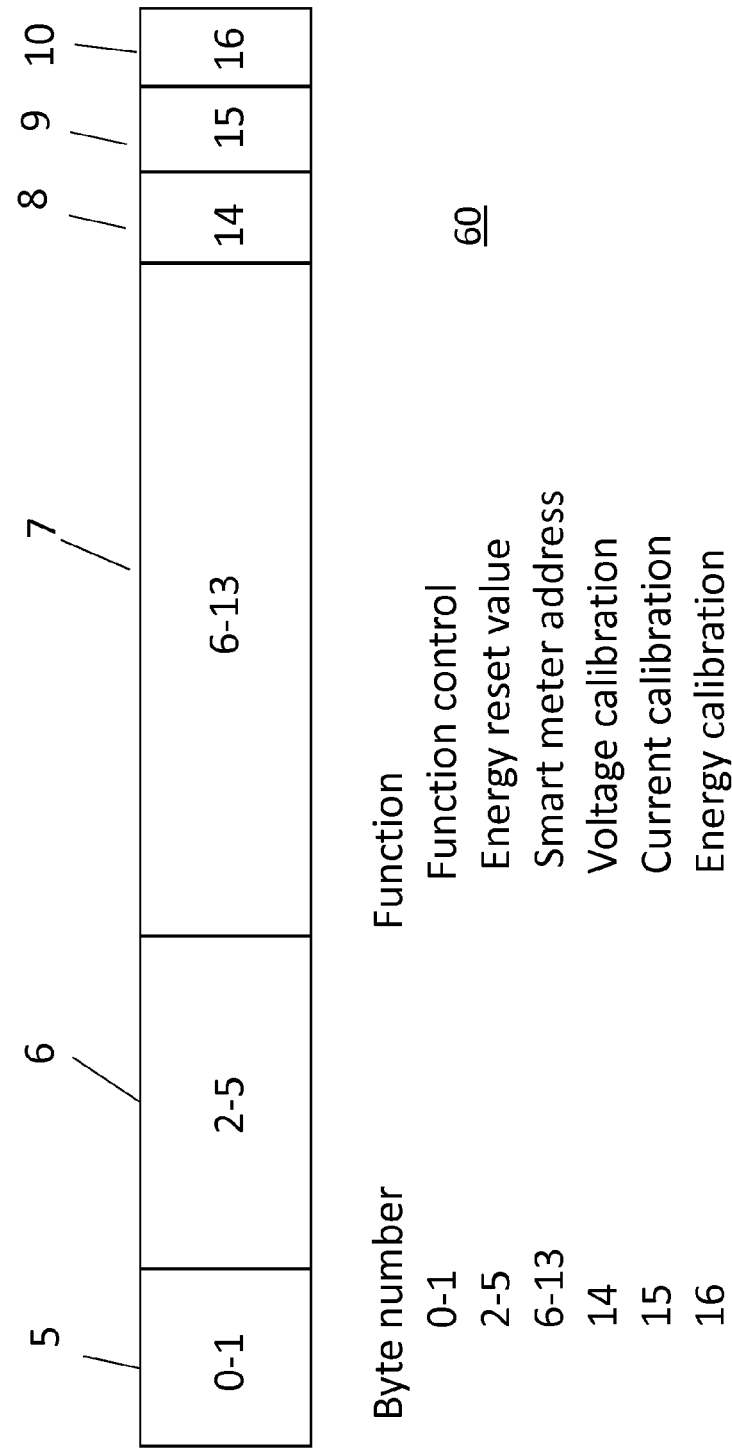
FIG. 2 is an illustration of an embodiment of contents of a coordinator-server interface control register utilized in a coordinator of the smart meter system.

FIG. 2 is an illustration of an embodiment of contents of a coordinator-server interface control register 60 utilized in a coordinator of the smart meter system. The register 60 comprises a function control field 5, energy reset value field 6, smart meter address field 7, voltage calibration value field 8, current calibration value field 9, and energy calibration time field 10.

One of ordinary skill in the art readily recognizes there could be more or less fields in the data packet and its use would be within the spirit and scope of the present invention. In addition the fields could be in any order or could of different types and that would also be within the spirit and scope of the present invention.

FIG. 3 is an illustration of the more detail of the contents within the coordinator-server interface control register 60.

The bytes 0 and 1 include function control (SerControl) field 5, which comprises a parameter register read enable (bit 0), parameter register write disable or control register write enable (bit 1), energy calculation reset (bit 2), relay enable (bit 3), network discovery enable (bit 4), routing table read enable (bit 5), control register read enable (bit 6), data register read enable (bit 7).

The byte 1 bit 0 controls the calibration mode. Bytes 2 through 5 controls the energy rest value register (ENERGY_RESET_VALUE) 6 are the energy reset value, bytes 6 through 13 of the smart meter address (RM_ADD 7) are the addresses (for example, 64 bits) of the smart meter being addressed, byte 14 is the voltage calibration value (V_CAL) 8, byte 15 is the current calibration value (I_CAL) 9, and byte 16 is the energy calibration time (T_CAL) 10.

Figure 4:
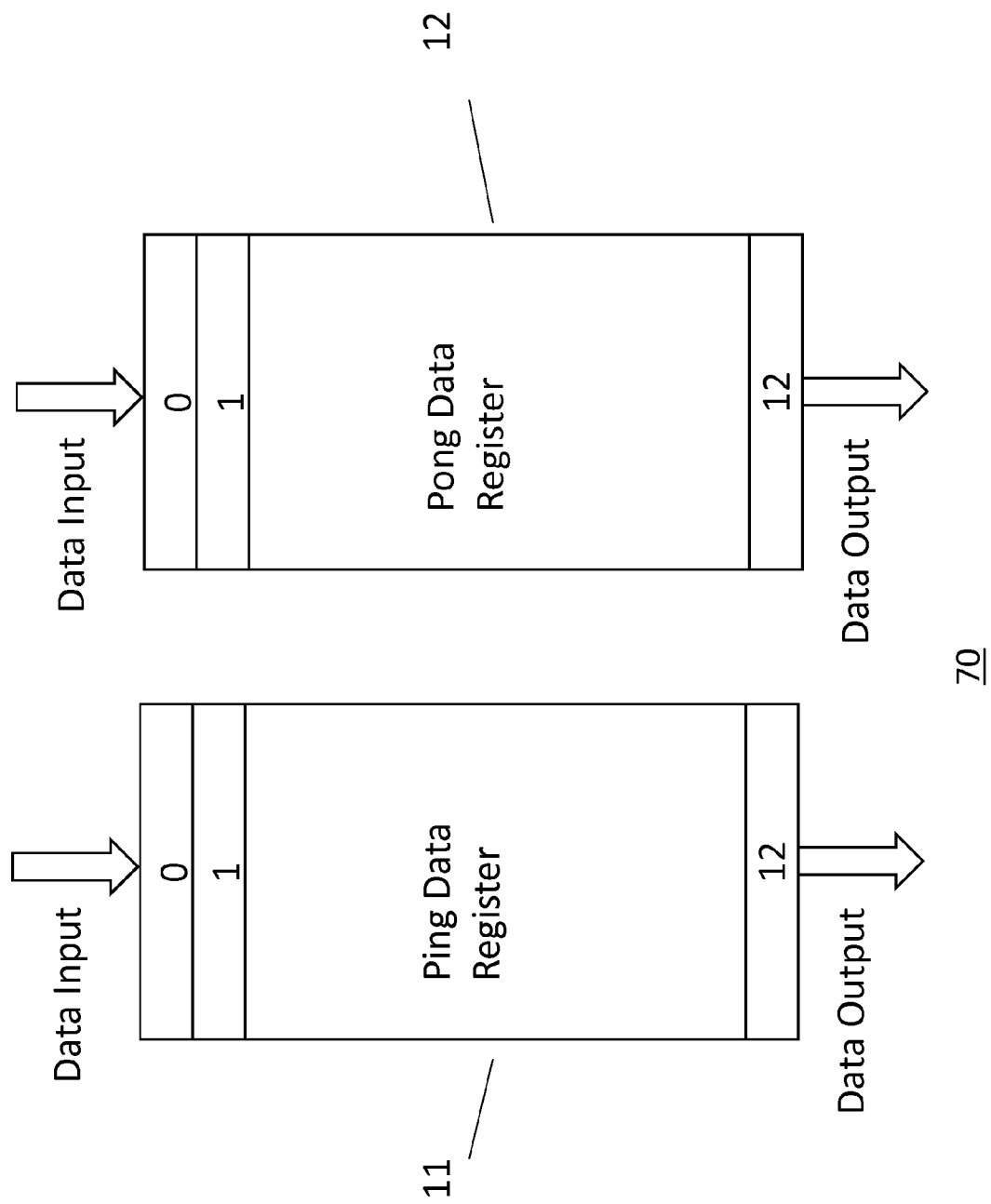
FIG. 4 is an illustration of an embodiment of a data register system that includes ping and pong registers.

FIG. 4 is an illustration of an embodiment of a data register system 70 includes ping and pong registers. While the ping data register 11 is waiting for data input from the smart meter 3, the data from the pong register data 12 is sent to the local server 1 and vice versa. Such a ping-pong configuration enhances performance of data transfer by eliminating the chance of collision when both read and write operations are accessing the same register.

FIG. 5 is an illustration of the contents of a data register 11 in accordance with an embodiment. In an embodiment, the contents comprise a smart meter address field 13, root-mean-square voltage (RMS_V) field 14, root-mean-square current (RMS_I) field 15, average power (POWER) field 16, average energy (ENERGY) field 17, smart meter power supply voltage (SM_V) field 18, smart meter power supply current (SM_I) field 19, and a status of smart meter subsystem (STATUS) field 20. The STATUS filed 20 contains information on the power connection, battery backup condition, state of battery charging, energy calculation reset condition, relay condition, and power calculation stop condition.

Figure 6:
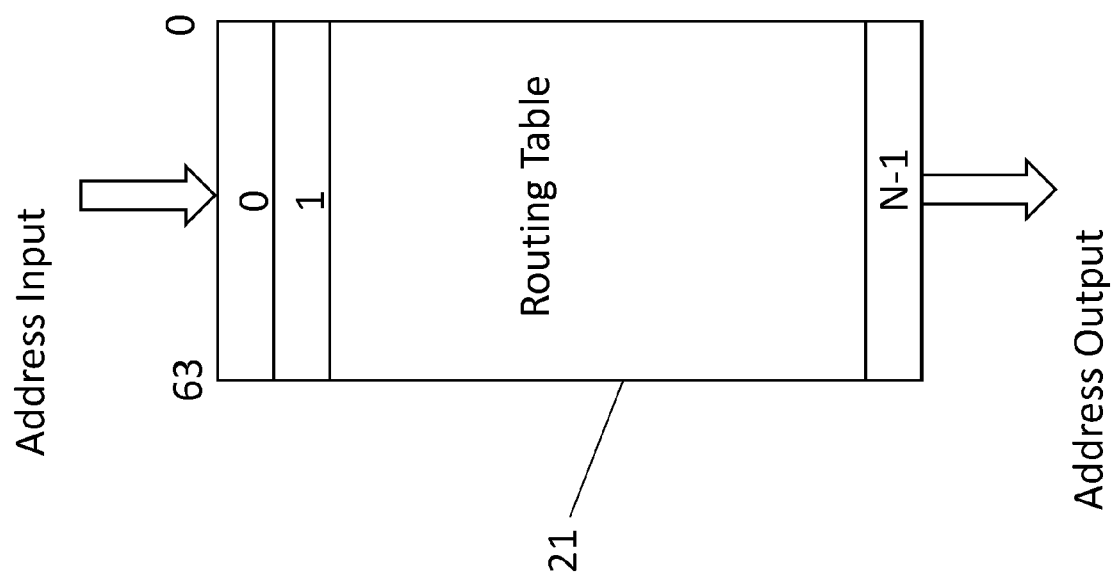
FIG. 6 is an illustration of the routing table that contains the addresses of N-smart meters.

FIG. 6 is an illustration of the routing table 21 that contains the addresses of N-smart meters. The routing table 21 contains the addresses (for example 64 bit addresses) of all the smart meters that are associated with the coordinator. (0 to N−1 for a system containing N smart meters).

Figure 7:
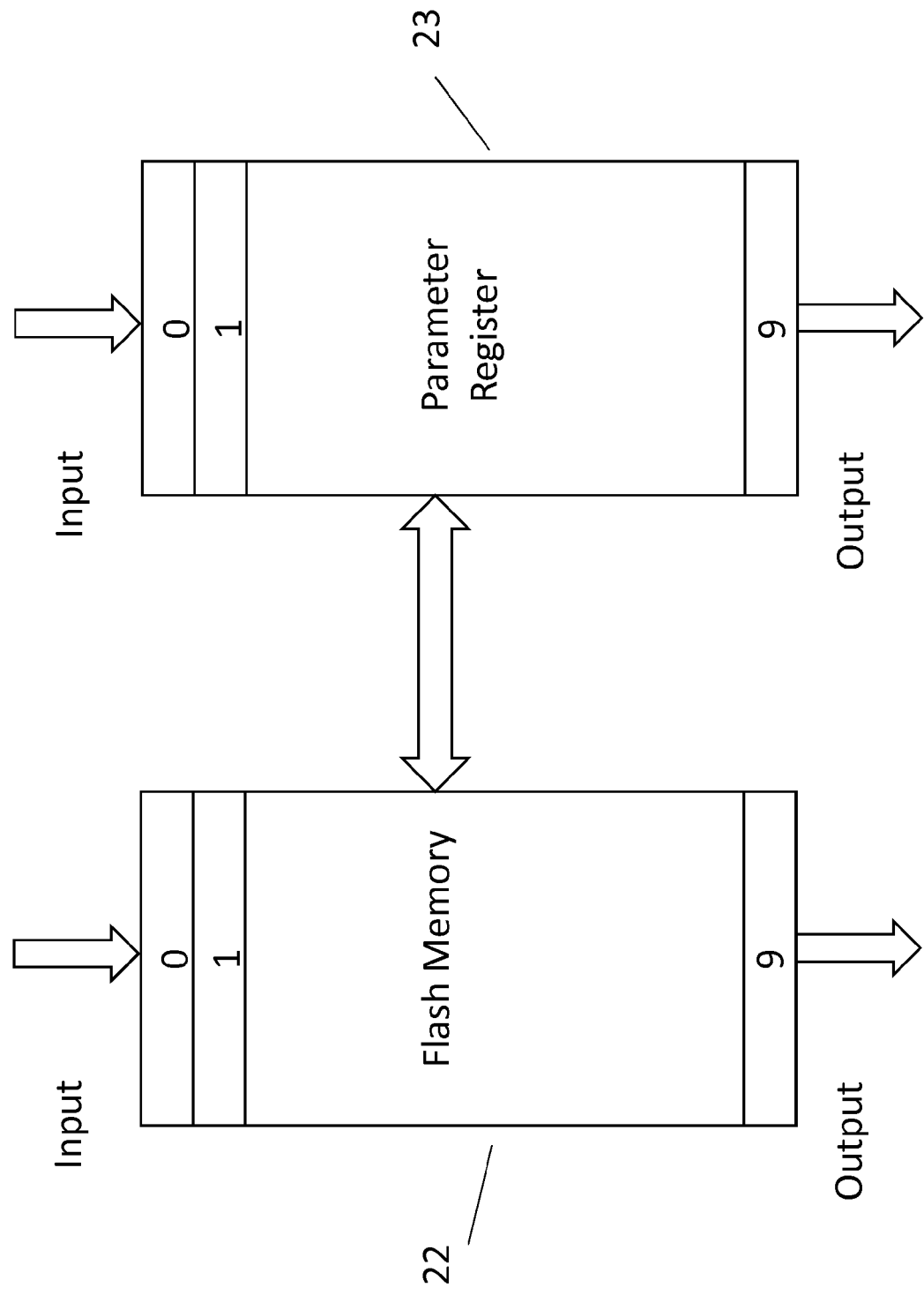
FIG. 7 is an illustration of the non-volatile flash memory and parameter register in accordance with an embodiment.

FIG. 7 is an illustration of a non-volatile memory 22 and a parameter register 23 in accordance with an embodiment. Parameters are stored in the non-volatile memory 22 that provided to the coordinator 2 and each of the smart meters 3. After power-on reset, the parameter register 23 is initialized by copying data from the flash memory 22. Then the contents of the parameter register 23 in the coordinator 2 is read by the server 1 and compared with a golden or absolutely correct copy in a memory within the server 1. If it is not identical, then the golden copy is written into the parameter register 23 and copied to the flash memory 22. Afterward, set parameter commands are issued by the coordinator 2 to update the parameter register 23 and the flash memory 22 within all of the smart meters. The local server 1 can also issue a read parameter command via the coordinator 2 to check the parameter of any smart meter 3 and update it if necessary.

FIG. 8 is an illustration of the contents of the parameter register 23 in accordance with an embodiment. As shown, the parameter register 23 includes a minimum output of an analog-to-digital converter or ADC (MIN_ADC) field 24, a maximum output of ADC (MAX_ADC) field 25, an interval used for sampling (SAMPLE_INT) field 26, a sample window size (SAMPLE_WIN) field 27, a current magnification factor (MAG_I) field 28, a voltage magnification factor (MAG_V) field 29, a minimum voltage field (MIN_V) 30, a maximum voltage (MAX_V) field 31, a minimum current (MIN_I) field 32, a maximum current (MAX_I) field 33, and an effective time period for energy calculation (T_EFF) field 34.

Figure 9:
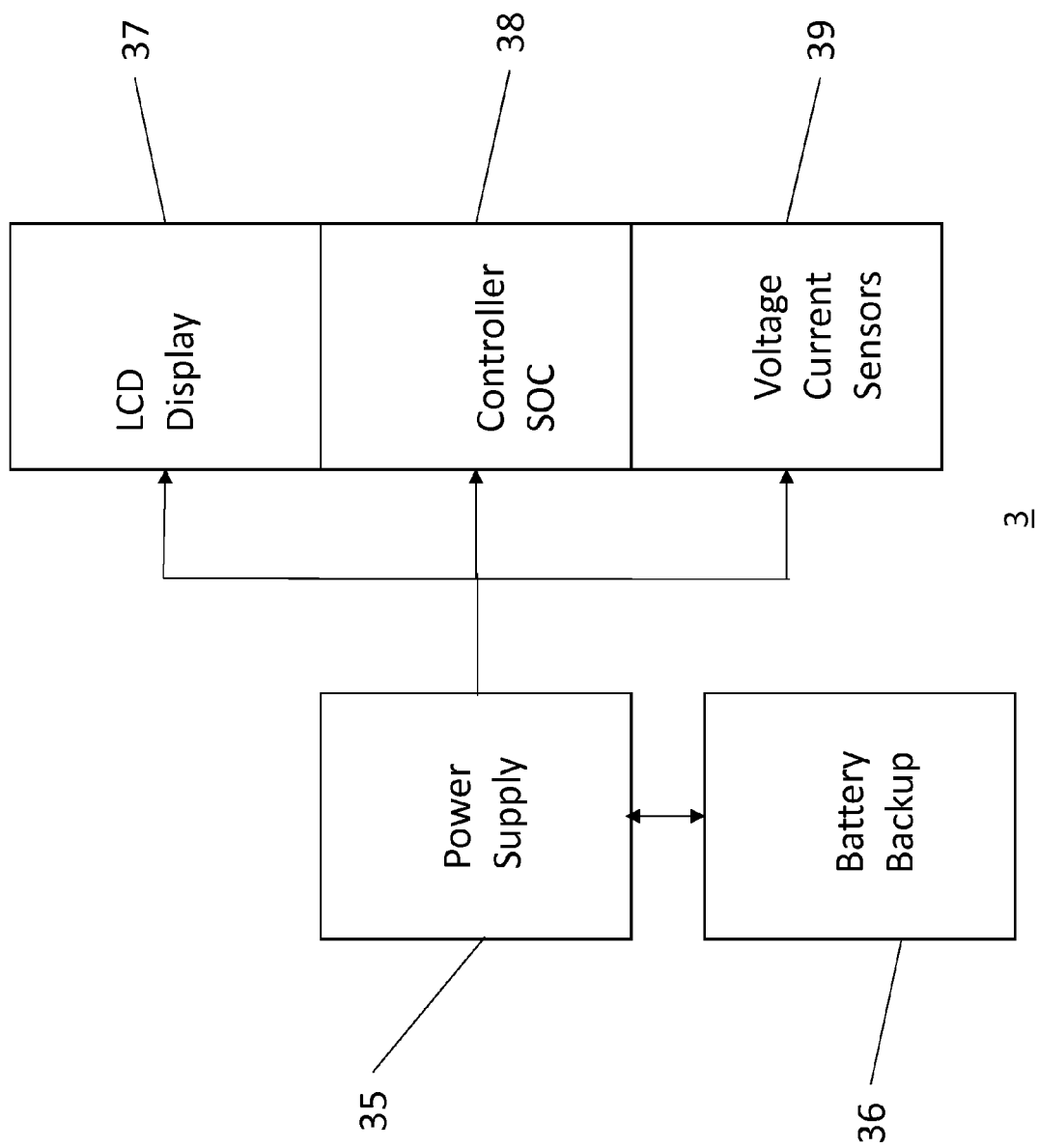
FIG. 9 is an illustration of a smart meter in accordance with an embodiment.

FIG. 9 is an illustration of a smart meter 3 in accordance with an embodiment. The smart meter subsystem comprises a power supply 35, a batter backup 36, a liquid crystal display or LCD display 37, a RF controller System-on-Chip (SOC) 38, and voltage and current sensors 39. The battery backup 36 provides a non-interruptible power supply in the event of a power failure. The battery backup 36 enables the detection of power failure in smart meter system. The status of the battery backup 36 is reported in the STATUS register 20 described in FIG. 5.

Figure 10:
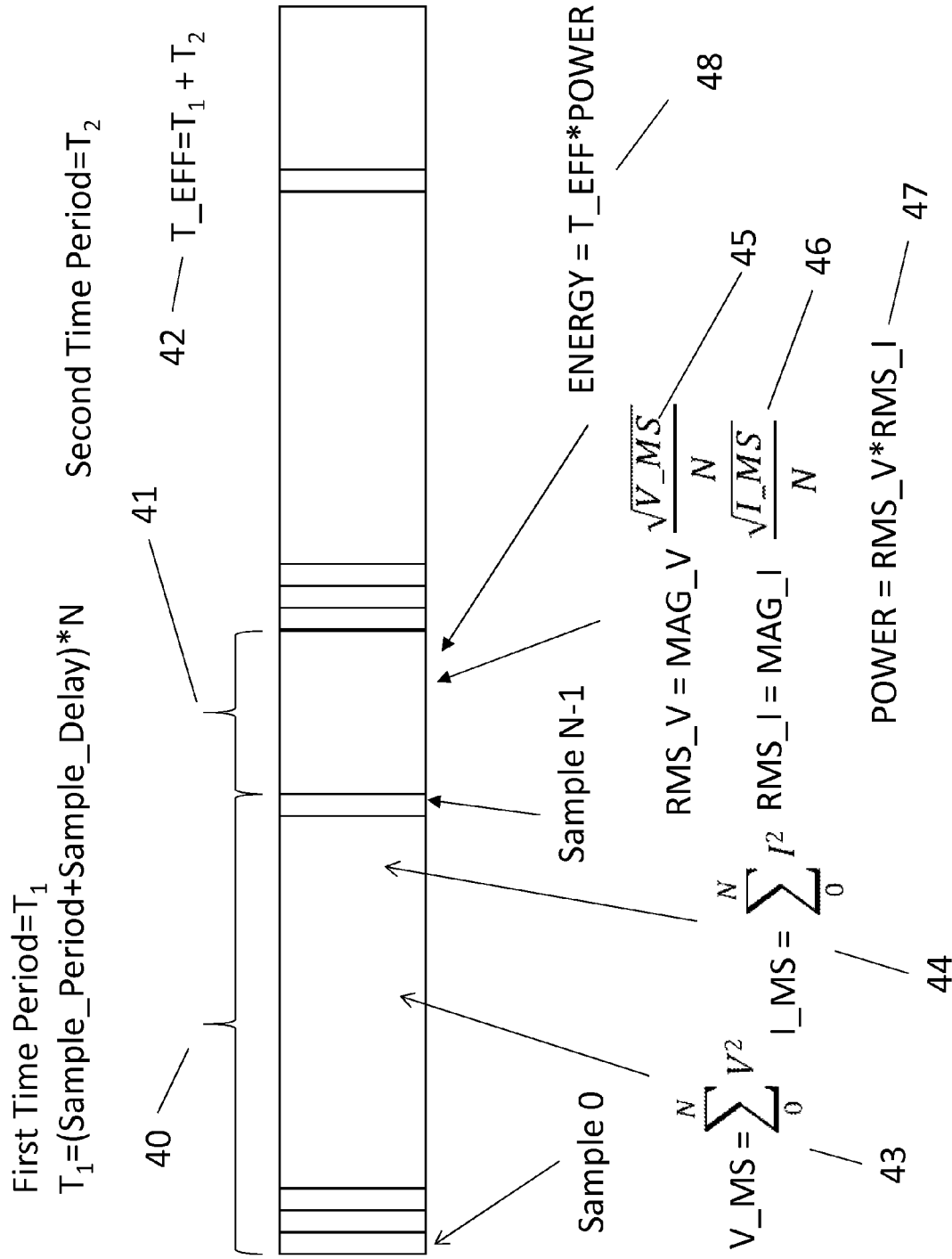
FIG. 10 is an illustration average energy calculation and calibration method in accordance with an embodiment.

FIG. 10 is an illustration of an energy calculation and calibration method utilized within the smart meter 3 in accordance with an embodiment. In an embodiment, the energy calculation is performed two time periods, T1 40 and T2 41. In the first time period T1 40, the mean-squares of voltage samples and mean-square of the current samples are calculated as V_MS 43 and I_MS 44 respectively.

In the second time period T2 41, the voltage and current samples of T1 40 are stopped. Thereafter a root-mean-square of voltage divided by total samples N and multiplied by a scaling factor MAG_V is calculated as RMS_V 45. Also the root-mean-square of current divided by total samples N and multiplied by a scaling factor MAG_I is calculated as RMS_I 46. The average power or the root-mean-square of the power POWER 47 is given by product of RMS_V 45 and RMS_I 46. After the average power is calculated, the voltage and current samplings are resumed for the next average power calculation. The scaling factors, MAG_V AND MAG_I are determined by a calibration method.

An average energy dissipation is calculated by multiplying POWER 47 by the effective time period, T_EFF 42 which is sum of T1 and T2. Each sampling time comprises a sampling period, Sample_Period plus a sample delay, Sample_Delay. The sample delay includes multiple delays, e.g. analog-to-digital conversion delays, voltage square calculation delays, and sum delays. Therefore, the first time period, T1 40 is N samples multiplied by the total sampling time. (Sample_Period+Sample_Delay). The second time period, T2 41, comprises square root calculation delays, division delays and multiplication delays. In principle, these delays can be calculated or measured for power calculation purpose. However, it is more convenient to calculate the effective time period T_EFF 42 by a calibration method.

The local server 1 can place the smart meter system in a calibration mode by setting byte 1 bit 0 of the control register illustrated in FIG. 3. In the calibration mode, a calibration voltage is applied across a precision resistor connected as a load in the power line. A voltage scaling factor, MAG_V, is calculated by dividing calibration voltage root-mean-square value V_CAL 8 in FIG. 3, by the measured average voltage root-mean-square of N-samples ($1/N * \sqrt{V\_MS}$). Similarly, a current scaling factor, MAG_I, is calculated by dividing calibration current root-mean-square I_CAL 9, in FIG. 3 by the measured average current root-mean-square of N-samples ($1/N * \sqrt{I\_MS}$). In addition, in the calibration mode, an effective time period, T_EFF 42, is calculated by dividing a calibration ENERGY value measure in time period T_CAL 10 in FIG. 3 (V_CAL*I_CAL*T_CAL) by the measured POWER 47 and the number of cycles in this time period. This calibration procedure may be utilized to simplify the calibration of smart meters 3 during product testing and manufacturing.

Utilizing a system a method in accordance with an embodiment allows for analyzing the energy dissipation of a smart meter system in a variety of contexts. These contexts could include but are not limited to: for the purpose of optimizing power consumption; for energy usage for the purpose of automated billings and payments for the power used, to detect power usage anomalies due to tampering of smart meters, for the detection of power usage anomalies and then enable power cutoff by disabling a power relay in the smart meter; and to detect power failure to enable service calls to repair the power system.

Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk—read/write (CD-RAN). To describe the features of the present disclosure in more detail refer now to the following description in conjunction with the accompanying Figures.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A data communication system comprises:
a local server,
a plurality of smart meters; and
a coordinator coupled to the local server; wherein the local server sends commands to the coordinator via a control register; wherein the control register is utilized to coordinate activities of the plurality of smart meters; the coordinator includes a data register system; wherein the data register system comprises a pair of registers configured such that performance of data transfer is enhanced by eliminating the chance of collision when both read and write operations are accessing a same register; wherein when the local server places each of the plurality of smart meters in a calibration mode, a calibration voltage is applied across a resistor connected as a load in a power line of each of the plurality of smart meters; a voltage scaling factor is calculated by dividing a calibration voltage root-mean-square value by a measured average voltage root-mean-square of N-samples, a current scaling factor is calculated by dividing calibration current root-mean-square by a measured average current root-mean-square of N-samples and an effective time period is calculated by dividing a calibration energy value measured in a time period by a measured power and a number of samples in the time period.

2. The data communication system of claim 1, wherein the local server is connected by wires to the coordinator.

3. The data communication system of claim 1, wherein the coordinator is connected wirelessly to the plurality of smart meters.

4. The data communication system of claim 1, wherein the control register comprises a plurality of bytes, wherein the plurality of bytes have associated control functions, energy reset value, address, and calibration parameters.

5. The data communication system of claim 1, wherein the control register comprise commands for parameter register read enable, parameter register write disable, control register write, energy calculation reset, relay enable, network discovery enable, routing table read, control register read, data register read, calibration enable, energy calculation reset value, address of a smart meter, and calibration values.

6. The data communication system of claim 5, wherein the coordinator resets the control register to a default state upon completion of the execution of the commands.

7. The data communication system of claim 6, wherein during rest the local server reads the control register to determine when a command is completed and then issues another command.

8. The data communication system of claim 1, wherein the data register system comprise ping and pong registers.

9. The data communication system of claim 8, wherein while ping register is waiting for data from a first smart meter, the data in the pong register sent from a second smart meter is read by the local server and vice versa.

10. The data communication system of claim 1, wherein all the addresses of the plurality of smart meters in communication with the coordinator are stored in a routing table.

11. The data communication system of claim 10, wherein the routing table is updated periodically by a route discovery command sent from the local server and executed by the coordinator.

12. The data communication system of claim 1, wherein the parameters that are used for power and energy calculations are stored in non-volatile memories and parameters registers of the coordinator and the plurality of smart meters.

13. The data communication system of claim 12, wherein data is copied from non-volatile memory to parameter register by system synchronization operations comprises of get parameter and set parameter commands.

14. The data communication system of claim 12, wherein the coordinator sends a get data command sequentially to all the plurality of smart meters that are listed in a routing table with a constant time delay in between sending commands.

15. The data communication system of claim 1, wherein the plurality of smart meter can be powered by a battery subsystem in the event of a power failure to enable a power failure detection in the plurality of smart meter.

* * * * *